United States Patent
Kruse

(10) Patent No.: US 11,485,473 B2
(45) Date of Patent: *Nov. 1, 2022

(54) AIRFOIL BODY

(71) Applicant: SolAero Technologies Corp., Albuquerque, NM (US)

(72) Inventor: Matthew Kruse, Aliso Viejo, CA (US)

(73) Assignee: SolAero Technologies Corp., Albuquerque, NM (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/086,343

(22) Filed: Oct. 31, 2020

(65) Prior Publication Data

US 2021/0101670 A1 Apr. 8, 2021

Related U.S. Application Data

(62) Division of application No. 15/963,400, filed on Apr. 26, 2018, now Pat. No. 10,933,973.

(51) Int. Cl.
| | |
|---|---|
| *B64C 3/00* | (2006.01) |
| *B64C 3/32* | (2006.01) |
| *H02S 10/40* | (2014.01) |
| *B64C 3/18* | (2006.01) |
| *B64C 3/26* | (2006.01) |
| *B64C 39/02* | (2006.01) |

(52) U.S. Cl.
CPC ............... *B64C 3/32* (2013.01); *B64C 3/185* (2013.01); *B64C 3/187* (2013.01); *B64C 3/26* (2013.01); *B64C 39/024* (2013.01); *H02S 10/40* (2014.12); *B64C 2201/021* (2013.01); *B64C 2201/066* (2013.01); *B64C 2201/104* (2013.01); *B64D 2211/00* (2013.01)

(58) Field of Classification Search
None
See application file for complete search history.

(56) References Cited

U.S. PATENT DOCUMENTS

| | | | | |
|---|---|---|---|---|
| 8,746,620 | B1 * | 6/2014 | Moussouris | B64C 3/46 244/123.1 |
| 2006/0145030 | A1 * | 7/2006 | Cowan | B64C 3/48 244/219 |
| 2006/0261213 | A1 * | 11/2006 | Lavan | B64C 3/30 244/30 |
| 2010/0051755 | A1 * | 3/2010 | Nichols | B64C 39/08 244/45 R |
| 2013/0099063 | A1 * | 4/2013 | Grip | B64C 3/26 156/60 |
| 2013/0284853 | A1 * | 10/2013 | Farbolin | B64C 31/02 244/16 |
| 2014/0224298 | A1 * | 8/2014 | Grimsley | H02S 20/32 136/246 |

(Continued)

*Primary Examiner* — Richard G Davis

(57) ABSTRACT

An airfoil body for an aircraft extending from an inner end to an outer end, and between a leading edge and a trailing edge. The airfoil body comprises an internal structure and an airfoil skin covering the internal structure. The skin has a pressure side and a suction side, and the suction side includes a light transmitting portion. The internal structure includes an array of transduce elements attached to a planar sheet with the airfoil body. The present disclosure further relates to wings and aerial vehicles.

16 Claims, 5 Drawing Sheets

(56) References Cited

U.S. PATENT DOCUMENTS

| | | | |
|---|---|---|---|
| 2014/0252156 A1* | 9/2014 | Hiebl | B64C 39/024 244/3 |
| 2015/0014482 A1* | 1/2015 | Weierman | H02S 10/40 244/124 |
| 2015/0256123 A1* | 9/2015 | Ahn | B64D 27/24 136/246 |
| 2016/0368590 A1* | 12/2016 | Karem | H02S 20/30 |
| 2017/0073058 A1* | 3/2017 | Fournier | B64D 39/00 |
| 2017/0106585 A1* | 4/2017 | Nino | B29C 70/882 |
| 2017/0331323 A1* | 11/2017 | Ehrmantraut | H02S 40/38 |
| 2018/0273170 A1* | 9/2018 | D'Sa | B64C 3/32 |
| 2019/0077497 A1* | 3/2019 | Uhlig | B64C 39/04 |
| 2019/0100321 A1* | 4/2019 | Sun | H02J 7/35 |
| 2019/0294755 A1* | 9/2019 | Colas | B64C 3/14 |
| 2020/0094978 A1* | 3/2020 | David | B64C 39/024 |
| 2020/0108909 A1* | 4/2020 | Elson | B64C 3/14 |

* cited by examiner

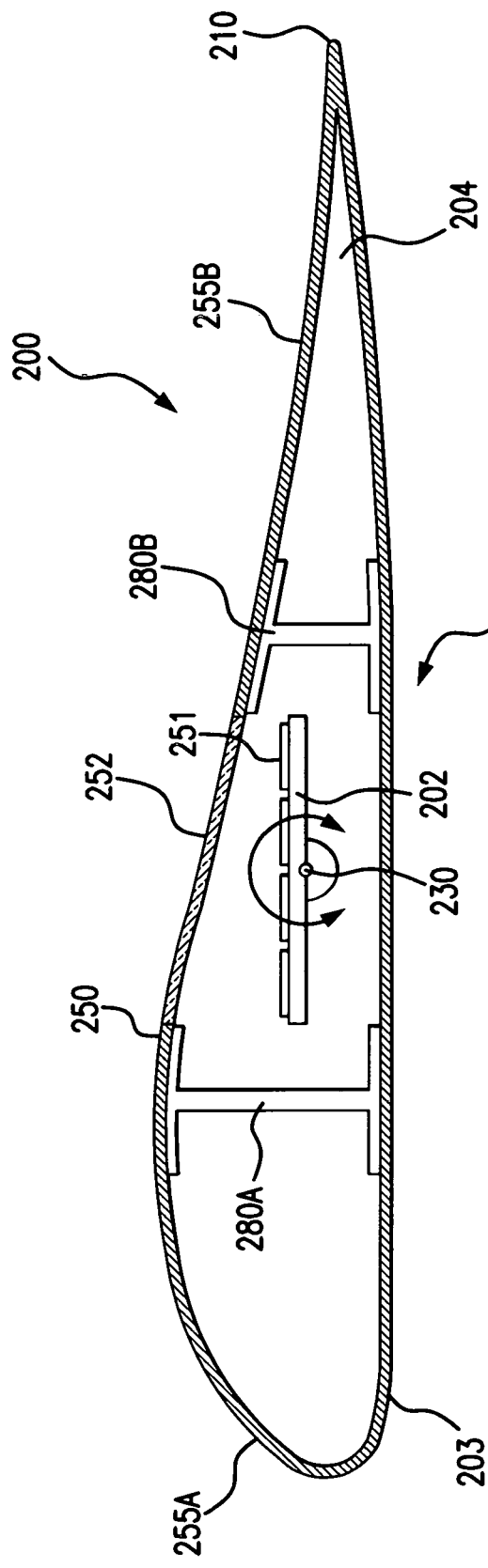
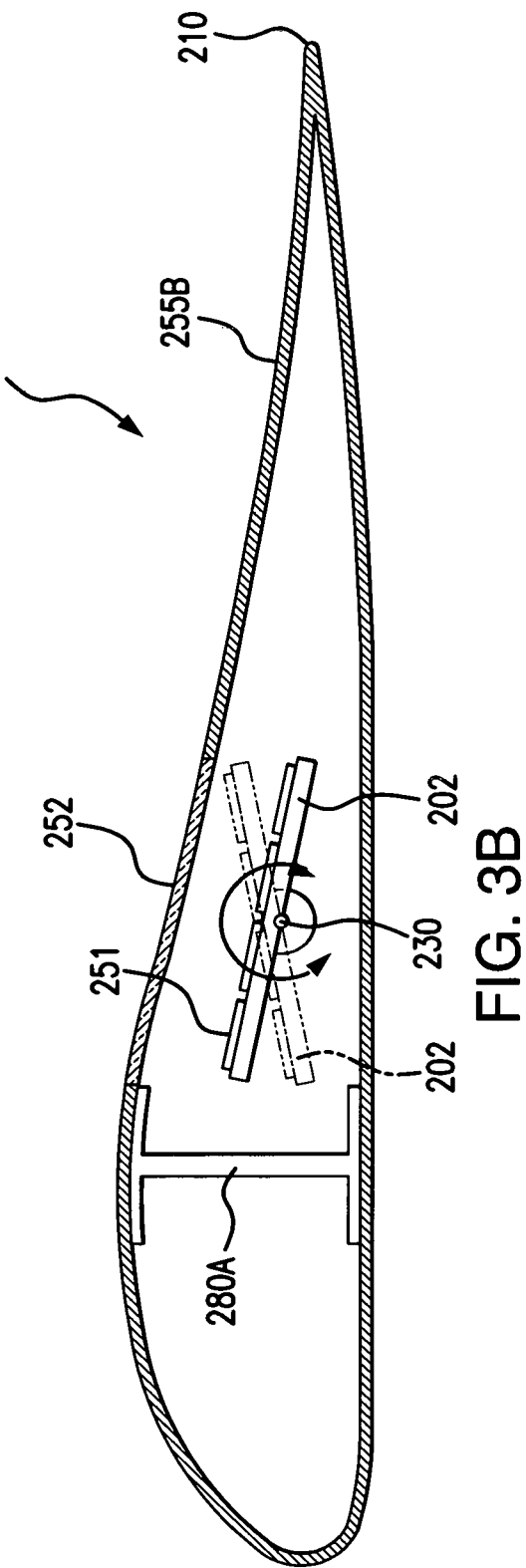
FIG. 3A
FIG. 3B

AIRFOIL BODY

REFERENCE TO RELATED APPLICATION

This application is a division of U.S. patent application Ser. No. 15/963,400 filed Apr. 26, 2018.

BACKGROUND

The present disclosure relates generally to an airfoil body for an aircraft. More particularly, the present disclosure relates to airfoil bodies comprising transducer elements, and in particular an array of solar cells. The present disclosure further relates to wings or wing sections for aerial vehicles incorporating solar cells, and to aerial, particularly unmanned aerial vehicles, comprising such wings.

Solar panels are generally formed by arranging a large number of solar cells in an array. Individual solar cells, frequently with a rectangular or generally square-shape and sometimes with cropped corners, are connected in electrical series to form a string of solar cells, whereby the number of solar cells used in the string determines the output voltage. Individual solar cells, or strings of solar cells, can also be interconnected in parallel, so as to increase the output current of the array.

Aircraft that have arrays of photovoltaic solar cells i.e. solar panels on the aircraft's wings for converting solar energy into electrical power are known. The electrical power may be used to operate on-board aircraft systems and/or to propel the aircraft, typically using one or more electric motors and propellers. The solar arrays are typically mounted on a suction surface (upper surface) of the wings since such location provides favorable exposure to sunlight.

Designing solar powered aircraft, particularly those flying at high altitudes, has several challenges. The surface area of photovoltaic cells needed to provide sufficient electrical power for propelling an aircraft may be significant. If the photovoltaic cells are to provide all or a significant part of the power needed for propelling the aircraft, a large wingspan is needed. At the same time, the weight of the (wing) structure needs to be controlled. However, long, lightweight wings may be highly flexible, presenting a number of problems for the photovoltaic cells due to the loads imposed on the wings during flight.

Particularly, the flexing of the aircraft's wings during flight may cause the solar panels to experience high strains that can adversely affect the integrity of the solar panels, particularly the connection between the individual solar cells forming the solar panel. These strains may also result in buckling or wrinkling of the solar panels which may trip the airflow boundary layer over the wings from laminar to turbulent, or cause air flow separation, which may significantly reduce the aerodynamic performance of the aircraft.

It is an object of the present disclosure to provide airfoil bodies and wings that at least partially resolve some of the aforementioned problems.

SUMMARY

In a first aspect, an airfoil body for an aircraft is provided. The airfoil body extends from an inner end to an outer end, and between a leading edge and a trailing edge. The airfoil body comprises an internal structure and a skin covering the internal structure, the skin having a pressure side and a suction side. The suction side includes a light transmitting portion, and the internal structure includes an array of solar cells configured to receive solar light through the light transmitting portion.

In accordance with this aspect, solar cells are provided internally of the airfoil body and therefore are subject to less deformations in comparison with a situation in which they are provided on the surface. Light can reach the solar cells through appropriately arranged light transmitting portions on the suction surface. The light transmitting portions may be substantially transparent or translucent.

Moreover, the placement of the solar cells, or encapsulated films incorporating such solar cells, on the (upper) surface of an airfoil can result in a "step" or discontinuity of the surface of the airfoil which prevents the laminar flow of air over the airfoil surface, thereby substantially decreasing the aircraft's performance and making such placement inconvenient. In accordance with the first aspect, this effect can be avoided.

In some examples, the internal structure may include one or more planar sheets and the array of solar cells is arranged on the planar sheets. In some examples, the airfoil body may further comprise an actuator to control the inclination of one or more of the planar sheets. By changing the inclination, an optimum or good orientation with respect to the incident solar rays can be achieved. A controller may rely on e.g. flight data and atmospheric conditions, geographical data and time of day to determine whether a change in orientation of the array of solar cells can render the solar cells more effective.

In some examples, the internal structure of the airfoil body may comprise a spar and one or more ribs attached to the spar and supporting the skin. A support structure with one or more spars and ribs is an efficient and lightweight structure. In some examples, one or more of the planar sheets span a width between a first rib and a second rib.

In some examples, one or more of the planar sheets may be arranged substantially parallel to the skin. Different arrangements of such planar sheets are possible. In particularly, their inclination can be fixed to be substantially horizontal or e.g. "leaning forward", i.e. the planar sheet may be inclined such that a front edge of the plane is closer to a pressure side than a rear edge of the plane.

The airfoil bodies may form part of a wing structure of an aerial vehicle, but they may also be used for e.g. part of a tail surface.

According to a further aspect, a wing for an aerial vehicle is provided. The wing extends from a blade root to a blade tip and from a leading edge to a trailing edge and defines a pressure side and a suction side. The wing comprises a wing skin and a support structure for supporting the wing skin, wherein the wing skin is configured to at least partially transmit light from an outside to an inside of the wing. And the wing furthermore comprises one or more transducer elements arranged in the inside of the wing.

The transducer elements may include a plurality of solar cells, wherein the solar cells are arranged to receive light through light transmitting portions of the wing, particularly on the suction side of the wing. Electrical power generated by the solar cells may be fed to a propulsion system on the aircraft and/or to auxiliary systems on the aircraft.

The transducer elements comprise may also include or alternatively include one or more of: semiconductor sensors, antennas, piezoelectric transducers and thermal transfer elements.

In some examples, light transmitting portions extend along 30% or more of a length from root to tip of a wing. In some examples, the light transmitting portions are (predominantly) arranged in a portion of the wing that is closer to the root than to the tip, i.e. in an inboard section of the wing. The inboard section of a wing typically has an increased chord length, and increased airfoil thickness. As a result, there is more space to arrange transducer elements, such as e.g. solar cells.

In yet a further aspect, an aerial vehicle is provided, which comprises one or more wings according to any of the examples herein disclosed. In some example, the aerial vehicle may be unmanned aerial vehicle.

In yet a further aspect, an airfoil body for an aircraft is provided. The airfoil body extends from an inner end to an outer end, between a leading edge and a trailing edge and having a pressure surface and a suction surface. The airfoil body comprises an outer surface and an inner support structure. One or more sections of the suction surface are made of a transparent material such that solar radiation energy is received through the transparent material in an internal portion of the airfoil body. And the internal portion comprises an array of solar cells configured to convert the solar radiation energy received into electricity.

BRIEF DESCRIPTION OF THE DRAWINGS

Non-limiting examples of the present disclosure will be described in the following, with reference to the appended drawings in which:

FIG. 3A and FIG. 3B schematically illustrates cross-sectional views of examples of an airfoil body.

DETAILED DESCRIPTION OF EXAMPLES

Figure 1:
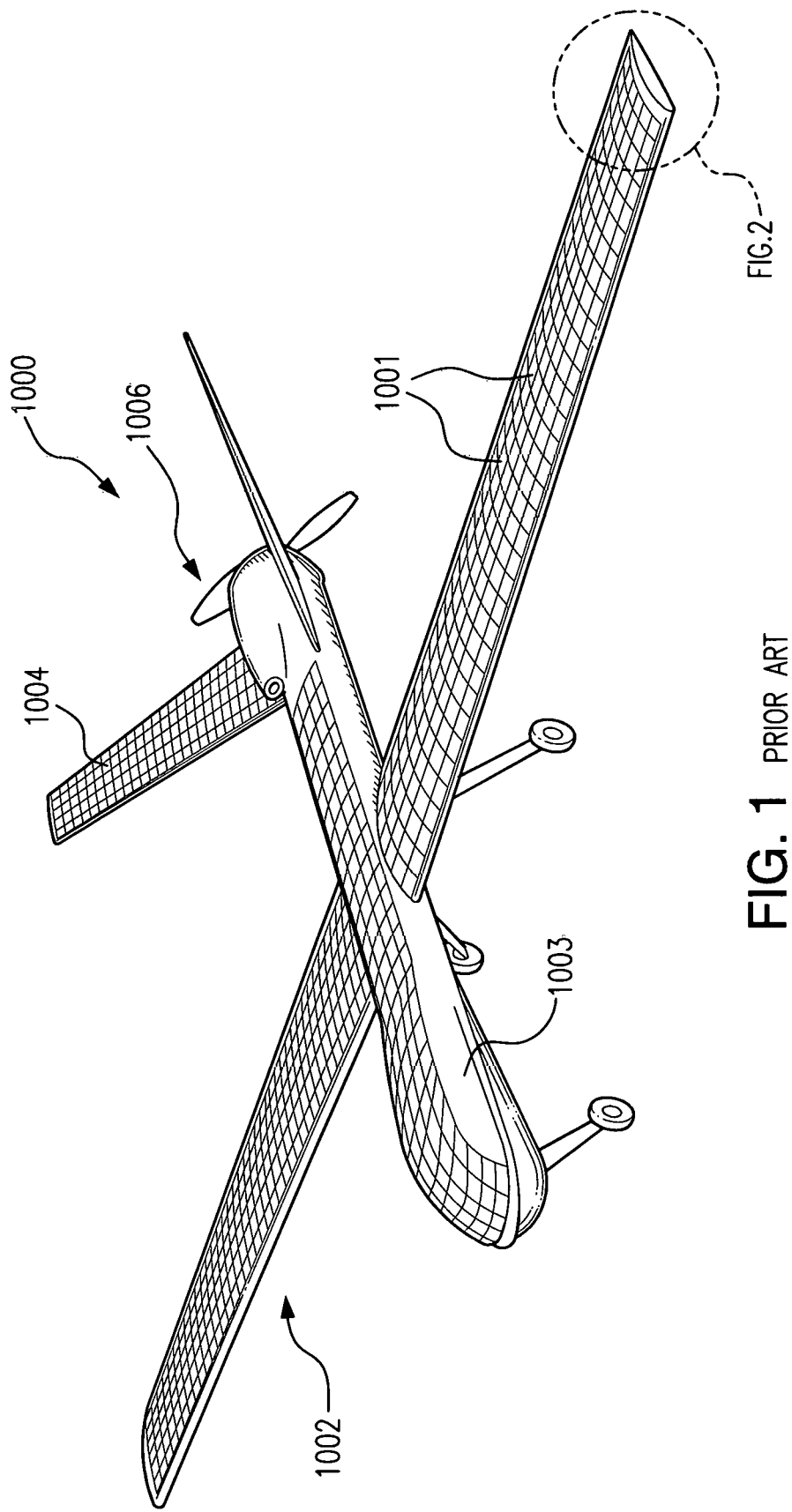
FIG. 1 schematically illustrates an example of a prior art aircraft design comprising arrays of solar cells.

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner Moreover, the drawings are not intended to depict every feature of the actual embodiment nor the relative dimensions of the depicted elements, and are not drawn to scale.

FIG. 1 is a perspective view of an aircraft 1000 having a solar cell assembly 1001 positioned on a suction surface of the wings 1002 of the aircraft 1000. The aircraft 1000 in this example is an unmanned aerial vehicle (UAV). Such a UAV may be used e.g. in surveillance missions.

In the example of FIG. 1, solar cells are not only provided on the wings 1002, but also on a top surface of a fuselage 1003, and on the suction surfaces of the horizontal tail surfaces 1004. Part or all of the electrical power generated by the solar cell assembly may be provided to a propulsion assembly 1006 for propelling the UAV. The propulsion assembly may include one or more electric motors and one or more propellers.

Aerial vehicle are normally designed and constructed following significant weight constraints. The resulting structure from lightweight materials tends to be flexible and deform under loads during normal flying conditions. Flexing of the aircraft's wings during flight may cause the solar panels arranged on the top surface of the wind to experience high strains that can adversely affect the integrity of the solar panels, particularly the connection between the individual solar cells forming the solar panel.

Although in FIG. 1, a UAV is depicted, it is clear that the same solar cell arrangements could be provided in passenger aircraft. Also, in these cases, some or all of the electrical power generated may be fed to a propulsion system. Alternatively, or additionally, part or all of the electrical power may be provided to auxiliary systems on an aircraft. Such auxiliary systems may include e.g. navigational systems, flap or slat deployment and retraction mechanisms.

Similarly, although one embodiment discussed in the present disclosure is an airfoil wing, other structural components of an aircraft or UAV may incorporate the features of the present disclosure, as well as booms or tethered assemblies extending from the body of the aircraft or UAV.

Figure 2A:
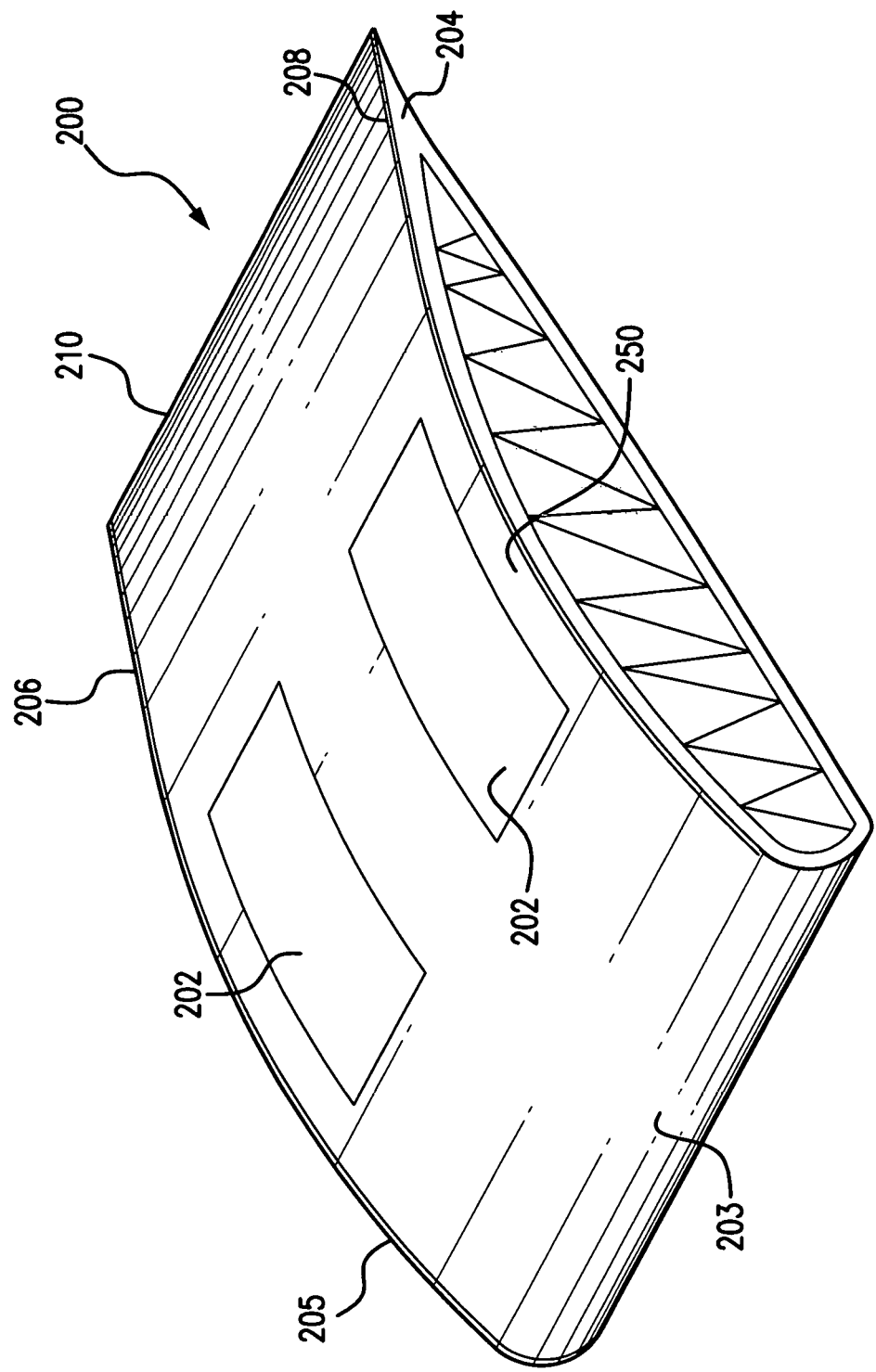
FIG. 2A and FIG: 2B schematically illustrate an airfoil body comprising solar cells according to an example of the present disclosure.

FIG. 2A is a perspective view of a portion of an example of an airfoil body 200 according to an example of the present disclosure. The airfoil body may form e.g. a wing section, or a section of a horizontal tail of an aircraft.

The airfoil body extends from a leading edge 203 to a trailing edge 210 and from an inner side 206 to an outer side 208. The airfoil body 200 comprises an inner support structure. Such an inner support structure may include ribs 205, 206 and may include one or more spars, or a box spar extending along the length of a wing.

The airfoil body includes a wing surface or wing skin 250 forming the outer surface of the airfoil body which is supported by the inner support structure. The wing skin may include additional (not shown) longitudinal or transverse stringers.

At the suction side of the airfoil body, light transmitting portions 202 may be arranged. In this particular example, the airfoil body includes two light transmitting portions.

A fiber reinforced composite may be used for the skin of the airfoil body. The fibers may include e.g. glass fibers, carbon fibers, Kevlar® fibers or combinations of these.

The light transmitting portions may be formed e.g. by portions of glass fiber reinforced composite. A suitable composition of resin and fibres can result in a substantially transparent wing surface.

In other examples, multiple smaller light transmitting portions could be provided. In yet further examples, substantially the whole suction surface may be substantially transparent.

Figure 2B:
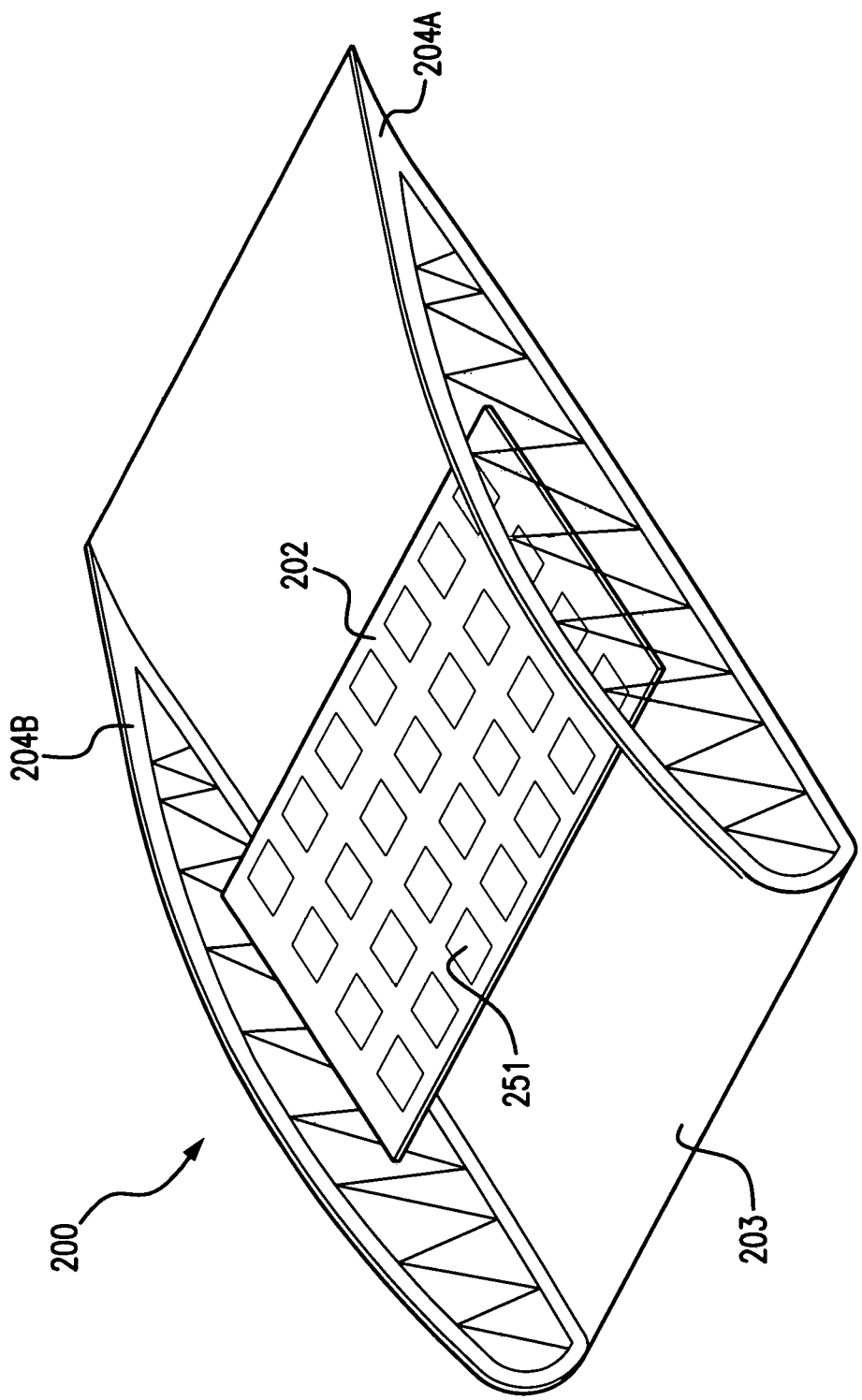

FIG. 2B is a perspective cut-away view of the airfoil body of FIG. 2A and shows the inside of the airfoil body. In the inside, in this particular example, a planar sheet 202 is provided on which a plurality of transducer elements 251, in particular solar cells are arranged. In this example, the planar sheet extends between two neighbouring ribs 204A and 204B. The planar sheet(s) may be made from fibre-reinforced polymers. The transducer elements may be attached to the planar sheet using adhesive, optionally a pressure-sensitive adhesive.

The length of the support member (in this case a planar sheet) may be at least 30%, 40% or 50% of the length of the (local) chord of the airfoil body.

In some examples, as mentioned before, the transducer elements 251 may be solar cells. The electrical power generated by the solar cells may be used e.g. for propulsion of an aircraft. In some examples, the transducer elements may include an array of semiconductor sensors. These sensors may be used for determining loads. In some examples, the transducer elements may include an antenna array for receiving and sending signals to a central control unit. Such a central control unit may be located inside the aircraft or at a remote location. In some examples, the transducer elements may include piezoelectric transducers for deforming and changing a surface of the airfoil body in response to control signals. In some examples, the transducer elements may include thermal transfer elements. Thermal loads may cause damage to e.g. solar cells. Thermal transfer elements may be provided with a goal to reduce thermal loads.

In some examples, various of these examples of transducer elements may be combined. For example, in some embodiments, the transducer elements may include an array of solar cells, and sensors and optionally antennas.

FIG. 3A is a cross-sectional view of an example of a wing segment. The outer surface of the wing segment includes a pressure surface 254 and a suction surface 252.

The inner support structure according to the example of FIG. 3A includes front spar 280A and a rear 280B. In this example, the front and rear spars are formed by I-beams. The inner support structure may typically include a plurality of ribs 204 connected to the spars 280A and 280B and incorporating the airfoil shape of the wing segment.

In this example, a planar sheet carrying a plurality of solar cells is arranged such that sun light can irradiate them through light transmitting portion 252. In this example, an actuator 230 can change the inclination of the planar sheet. In some examples, the appropriate angle of attack may be determined by a control system as a function of flight conditions (e.g. pitch angle of the aircraft). During a flight, the inclination of the planar sheet with solar cells may be changed.

In other examples, the inclination of the planar sheet may be fixed. In FIG. 3B two arrangements of a plane or sheet carrying solar cells are shown. In a first arrangement (in continuous line), the planar sheet is arranged substantially parallel to the local suction surface. In a second arrangement (in interrupted lines), the planar sheet is arranged leaning forward. As a result, in cruise flight, the planar sheet may be substantially horizontal.

In a preferred example, the solar cells may be arranged relatively close to the neutral bending axis. As a result, the solar cells will be subjected to relatively small compression and tension stresses and deformations.

Figure 4:
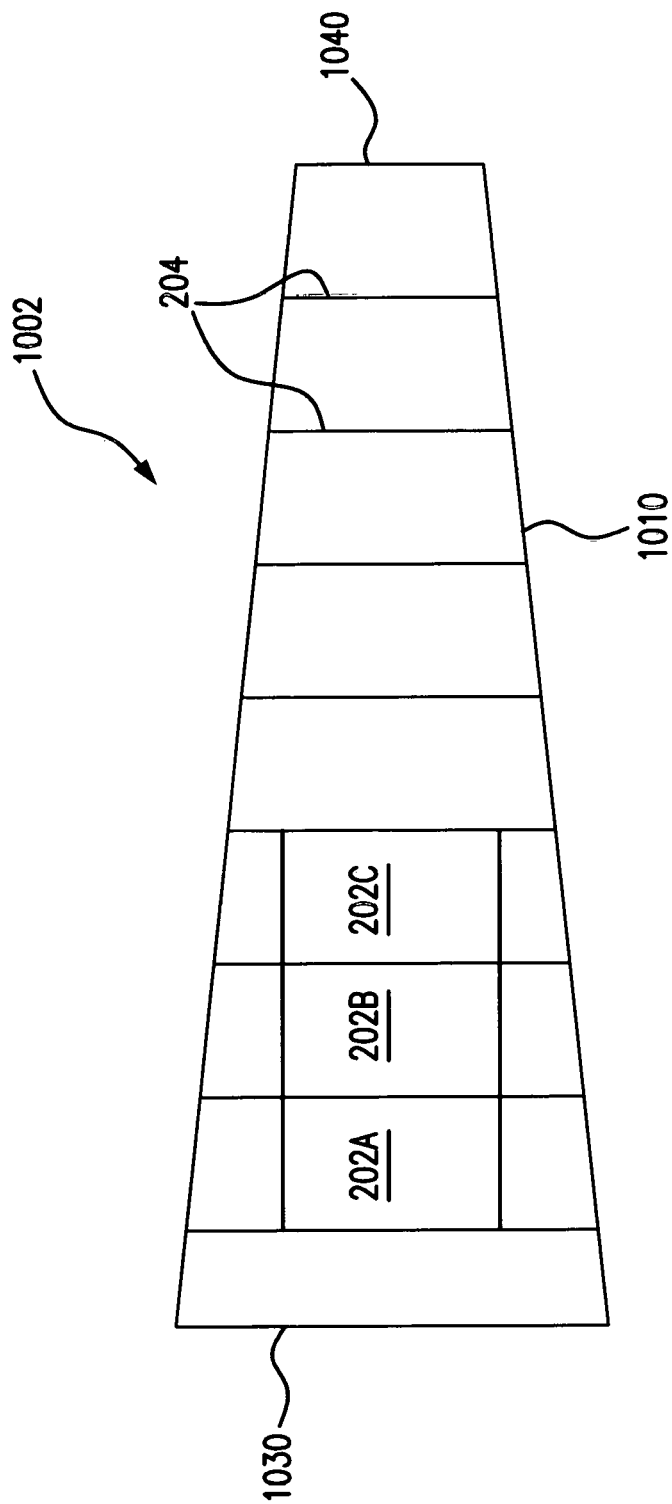
FIG. 4 schematically illustrates a top view of an example of a wing.

FIG. 4 schematically illustrates a top view of a wing 1002 having a root 1030 and a tip 1040. The wing has a leading edge 1020 and a trailing edge 1010. Along the length of the wing, a plurality of ribs 204 is shown. Between neighbouring ribs, a plurality of planes 202A, 202B and 202C is arranged. The planes may have substantially the same dimensions. In other examples, the size of the planes or sheets carrying the solar cells can vary.

The inboard section of the wing, e.g. the inner 25%, 30% or 40% of the wing may generally be stiffer and stronger than the outboard section of the wing. At the inboard section, the chord length is generally higher than for an outboard section. Also the thickness of the airfoil body at an inboard section may be higher than at an outboard section. There is thus more space to arrange solar cells on the inside of the wing.

In any of the herein disclosed examples, the transducer elements may be solar cells. The array of solar cells may include III-V compound semiconductor solar cells.

The solar cells may have electrical contacts of positive and negative polarity on the backsides of the solar cells, and have a thickness of less than 0.03 inches. In some examples, a plurality of solar cells are disposed closely adjacent to one another on each of the strips by a distance between 5 and 25 microns. In some examples, each of the solar cells is rectangular or square and have a dimension in the range of 0.5 to 10 mm on a side.

Reference throughout this specification to "one embodiment" or "an embodiment", "an example", "some examples", "one example" means that a particular feature, structure, or characteristic described in connection with the embodiment is included in at least one embodiment of the present disclosure. Thus, the appearances of the phrases "in one embodiment" or "in an embodiment" or "in some examples" in various places throughout this specification are not necessarily all referring to the same embodiment. Furthermore, the particular features, structures, or characteristics may be combined in any suitable manner in one or more further examples.

All ranges of numerical parameters set forth in this disclosure are to be understood to encompass any and all subranges or "intermediate generalizations" subsumed therein. For example, a stated range of "1.0 to 2.0 microns" for a value of a dimension of a component such as its thickness should be considered to include any and all subranges beginning with a minimum value of 1.0 microns or more and ending with a maximum value of 2.0 microns or less, e.g., 1.0 to 1.2, 1.3 to 1.4, or 1.5 to 1.9 microns.

It is to be noted that the terms "front", "back", "top", "bottom", "over", "on", "under", and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

In the claims, the word 'comprising' or 'having' does not exclude the presence of other elements or steps than those listed in a claims. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. An airfoil body for an aircraft extending from an inner end to an outer end, and between a leading edge and a trailing edge, comprising:
   an internal supporting structure;
   an airfoil skin composed of a fiber reinforced composite in which the fibers include one or more of (i) glass fibers, (ii) carbon fibers, or (iii) aramid fibers;
   A planar sheet composed of a fiber reinforced polymer disposed below the airfoil skin and supported by the internal supporting structure;
   an actuator disposed in the airfoil body;
   an array of transducer elements attached to the planar sheet comprising one or more of: (i) an array of semiconductor sensors not including solar cells; (ii) an antenna array; and (iii) thermal transfer elements; and
   a control system for controlling operation of the actuator as a function of flight condition of the aircraft so as to control an aspect of operation of the aircraft.

2. An airfoil body as defined in claim 1, wherein the antenna array receives and sends signals to the control system.

3. An airfoil body as defined in claim 1, wherein the semiconductor sensors determine loads on the airfoil body.

4. An airfoil body as defined in claim 1, wherein the internal supporting structure includes plurality of the ribs connected in spars.

5. An airfoil body as defined in claim 1, wherein the internal supporting structure includes a plurality of planar sheets, and the planar sheets are arranged in a non-parallel position with respect to the airfoil skin.

6. An airfoil body as defined in claim 5, wherein the transducer elements are arranged on different ones of the planar sheets, wherein the different ones of the planar sheets have varying sizes.

7. An Airfoil body as defined in claim 1, wherein, the aspect of operation of the aircraft is the angle of the attack of the aircraft.

8. An airfoil body as defined in claim 1, wherein the transducer elements are piezoelectric transducers for changing a surface of the airfoil body.

9. An airfoil body as defined in claim 1, wherein the control system further comprises determining the angle of attack of the aircraft.

10. An airfoil body as defined I claim 1, wherein the control system further comprises acquiring atmospheric information.

11. An airfoil body as defined in claim 1, wherein the control system is located at a remote location with respect to the aircraft.

12. An airfoil body as defined in claim 1, wherein the antenna array receives and sends signals to the control unit.

13. An airfoil body as defined in claim 1, wherein the internal supporting structure includes a plurality of ribs connected to spars.

14. An airfoil body as defined in claim 1, the aircraft is an unmanned aerial vehicle.

15. An airfoil body for an aircraft extending from an inner end to an outer end, and between a leading edge and a trailing edge, comprising:
   an internal supporting structure;
   an airfoil skin disposed over the internal supporting structure;
   a planar sheet disposed below the airfoil skin within the airfoil body;
   an array of transducer elements attached to the planar sheet comprising an array of semiconductor sensors not including solar cells; an actuator within the airfoil body;
   a control system coupled to the array of transducer elements for controlling operation of the actuator.

16. An airfoil body for an aircraft extending from an inner end to an outer end, and between a leading edge and trailing edge, comprising:
   an internal supporting structure;
   an airfoil skin disposed over the internal supporting structure;
   an actuator within the airfoil body;
   an array of transducer elements below the airfoil skin and within the airfoil body comprising one or more of: (i) an array of semiconductor sensors not including solar cells; (ii) an antenna array; and (iii) thermal transfer elements; and
   a control system coupled to the array of transducer elements for controlling operation of the actuator as a function of a flight condition of the aircraft.

* * * * *